United States Patent
Kirk et al.

(10) Patent No.: US 6,823,329 B2
(45) Date of Patent: Nov. 23, 2004

(54) DATABASE SYSTEM PROVIDING METHODOLOGY FOR ACCELERATION OF QUERIES INVOLVING FUNCTIONAL EXPRESSIONS AGAINST COLUMNS HAVING ENUMERATED STORAGE

(75) Inventors: Steven A. Kirk, Chelmsford, MA (US); Roger D. MacNicol, Bedford, MA (US); Fang-Ying Yen, Bedford, MA (US)

(73) Assignee: Sybase, Inc., Dublin, CA (US)

( * ) Notice: Subject to any disclaimer, the term of this patent is extended or adjusted under 35 U.S.C. 154(b) by 382 days.

(21) Appl. No.: 10/115,483

(22) Filed: Apr. 2, 2002

(65) Prior Publication Data

US 2003/0187858 A1 Oct. 2, 2003

(51) Int. Cl.[7] ............................................... G06C 17/30
(52) U.S. Cl. ......................................................... 707/2
(58) Field of Search ............................ 707/2, 3, 4, 100, 707/101; 711/100

(56) References Cited

U.S. PATENT DOCUMENTS

| | | | |
|---|---|---|---|
| 4,606,002 A | 8/1986 | Waisman et al. ............ 364/200 |
| 4,677,550 A | 6/1987 | Ferguson ..................... 364/300 |
| 5,293,616 A | 3/1994 | Flint .............................. 707/3 |
| 5,377,348 A | 12/1994 | Lau et al. ....................... 707/3 |
| 5,404,510 A | 4/1995 | Smith et al. .................... 707/2 |
| 5,448,727 A | 9/1995 | Annevelink ................. 707/101 |
| 5,495,608 A | 2/1996 | Antoshenkov ................. 707/3 |
| 5,649,181 A | 7/1997 | French et al. .................. 707/3 |
| 5,727,196 A | 3/1998 | Strauss et al. .................. 707/2 |
| 5,794,228 A | 8/1998 | French et al. .................. 707/2 |
| 5,794,229 A | 8/1998 | French et al. .................. 707/2 |
| 5,812,996 A | 9/1998 | Rubin et al. |
| 5,852,821 A | 12/1998 | Chen et al. ..................... 707/2 |
| 6,032,144 A | 2/2000 | Srivastava et al. ............. 707/3 |
| 6,182,060 B1 | 1/2001 | Hedgcock et al. ............. 707/1 |
| 6,560,594 B2 * | 5/2003 | Cochrane et al. .............. 707/2 |
| 6,564,204 B1 | 5/2003 | Amundsen et al. ............ 707/2 |
| 6,598,044 B1 | 7/2003 | Waas et al. ..................... 707/3 |
| 6,609,123 B1 | 8/2003 | Cazemier et al. .............. 707/4 |
| 6,665,664 B2 * | 12/2003 | Paulley et al. ................. 707/4 |
| 2002/0143754 A1 * | 10/2002 | Pauley et al. .................. 707/3 |
| 2003/0065874 A1 * | 4/2003 | Marron et al. ............. 711/100 |
| 2004/0064466 A1 * | 4/2004 | Manikutty et al. .......... 707/100 |

OTHER PUBLICATIONS

Tomasz Jastrzebski, MS SQL Server 2000 SELECT statement grammar, Aug. 25, 2003, // ANTLR Version: 2.7.2, from versio 8, www.antlr.org/grammar/, pp. 1–8.*

* cited by examiner

*Primary Examiner*—Diane D. Mizrahi
(74) *Attorney, Agent, or Firm*—G. Mack Riddle; John A. Smart

(57) ABSTRACT

An improved method for handling database queries including functional expressions against columns having enumerated storage is described. Upon receipt of a query including a predicate having at least one functional expression referencing at least one database column containing offsets to values in enumerated storage, a look-up table is created for storing results of evaluation of the predicate against the values in enumerated storage. Each functional expression of the predicate is evaluated against the values in enumerated storage and the results of evaluation are stored in the look-up table. Results stored in the look-up table may then be accessed through use of the offsets to values in enumerated storage. The method may also be utilized for projecting expressions against database columns having enumerated storage.

35 Claims, 8 Drawing Sheets

DATABASE SYSTEM PROVIDING METHODOLOGY FOR ACCELERATION OF QUERIES INVOLVING FUNCTIONAL EXPRESSIONS AGAINST COLUMNS HAVING ENUMERATED STORAGE

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

COMPUTER PROGRAM LISTING APPENDIX

A Computer Program Listing Appendix, containing one (1) total file on compact disc, is included with this application.

BACKGROUND OF THE INVENTION

1. Field of the Invention

The present invention relates generally to data processing environments and, more particularly, to system and methods for improved optimization and execution of queries involving functional expressions against database columns having enumerated storage.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

One purpose of a database system is to answer decision support queries and support transactions. A query may be defined as a logical expression over the data and the data relationships set forth in the database, and results in identification of a subset of the database. For example, a typical query might be a request, in SQL syntax, for data values corresponding to all customers having account balances above required limits. During query processing, a database system typically utilizes one or more indexes to answer queries. Indexes are organized structures associated with the data to speed up access to particular data values (i.e., answer values). Indexes are usually stored in the database and are accessible to a database administrator as well as end users. The basic operation of database systems, including the syntax of SQL (Structured Query Language), is well documented in the technical, trade, and patent literature; see, e.g., Date, C., *An Introduction to Database Systems*, Volume I and II, Addison Wesley, 1990; the disclosure of which is hereby incorporated by reference.

"Data warehouse" systems represent a type of database system optimized for supporting management decision making by tracking and processing large amounts of aggregate database information—that is, the data warehouse. Data warehouses contain a wide variety of data that present a coherent picture of business conditions at a single point in time. Development of a data warehouse includes development of systems to extract data from operating systems plus installation of a warehouse database system that provides managers flexible access to the data. A well-known example of a data warehouse system is Sybase® Adaptive Server® IQ (ASIQ), available from Sybase, Inc. of Dublin, Calif.

A data warehousing system typically handles large pools of historical information representing different portions of a business. These different portions may, for example, represent a number of different geographical areas, such as information relating to sales to customers located in Texas, Georgia, Massachusetts, New York, and Maine. The information may also represent different periods of time, such as sales in particular calendar months or quarters. A number of different products and/or business units may also be involved. Database systems frequently store very large quantities of information and for this reason database administrators continuously look for ways to more efficiently store and retrieve information in database systems.

One well-known technique for more efficiently storing information in database systems is utilizing enumerated storage. Enumerated storage utilizes a dictionary look-up style scheme in which the dictionary (or look-up table) contains a list of distinct values, with each distinct value associated with a particular offset which serves as an address for locating that value. Instead of redundantly storing the same information, such as the name of a particular state (e.g., New York) multiple times in a column of the database table, the look-up table contains values that will be used as the contents of the column. The column in the main database table may then store only the offset. However, since there is a relationship between the look-up table and the main table, the value associated with offset in the look-up table is also associated with the record in the main table. For example, a database column T.STATE_NAME with enumerated storage may have a look-up table such as the following:

| offset | 1 | Texas |
|---|---|---|
| | 2 | Georgia |
| | 3 | Massachusetts |
| | 4 | New York |
| | 5 | Maine |

In a situation where the number of distinct values in a particular column of a database is modest (e.g., 50 states) compared to the number of rows in the table, this enumerated storage scheme is considerably more space efficient than repeatedly storing the same raw data values in the database column, and thereby requires fewer input/output (I/O) operations to read or write.

One problem in handling many database queries is the evaluation of functional expression on columns. Considerable effort is spent in database query engines to identify the point in a query plan where a functional expression should be evaluated in order to minimize the estimated number of evaluations of the expression. If a predicate (or condition) includes complex or simple expressions over column(s) that cannot be answered from an index, then formulating an answer to the predicate involves the expensive (in terms of system performance) task of scanning all of the raw data values of the column, row by row, in order to respond to the query. For instance, a column may contain state names. A user could use an expression such as the following to obtain all state names beginning with the letter "S":

SELECT T.CUSTOMER FROM T

WHERE T.STATE_NAME LIKE 'S%'

Typically, a traditional B-Tree index would enable a user or administrator to easily select all states beginning with a particular letter, because the first letter is the leading portion of the string. However, if a user wanted to find the second letter of a state name, this could not be handled using the index as this string is in the middle of the data. As a result there is no traversal path in the index that will lead to the answer. Thus, a table scan (or column scan) would typically be required to handle this type of query expression in current database systems.

Consider, for example, the following Structured Query Language (SQL) statement:

SELECT T.CUSTOMER FROM T
WHERE SUBSTRING(T.STATE_NAME, 2, 1)='e'

This type of expression could not be resolved from a typical B-Tree index. It also is problematic to resolve against a column with enumerated storage in current database systems, as it requires a column scan of the raw data in order to evaluate the query. If one has a large column with billions of rows, this is an expensive task to undertake, as it could easily require the evaluation of the expression billions of times.

If a database administrator knows in advance that a particular query using a particular functional expression will be used, one possible way to address this problem is by using the concept of "materialized views." This approach involves executing a particular query in advance and storing the results in an index or data structure. Materialized views may be useful when an administrator knows in advance that a particular query expression containing specific functional expressions will be used. When a query optimizer subsequently receives that particular query (e.g., a specific query expression containing the exact same set of substitution arguments), the optimizer accesses the pre-computed results to generate a response. However, this materialized view approach is only useful for a pre-defined query, where a specific query expression is known in advance and is not varied. This may be useful for things like a standard monthly or quarterly report. However, it is not useful for data mining or ad-hoc analysis. Data mining or ad-hoc analysis involves following hunches, taking different views of information, and exploring business data differently in order to gain a better understanding about a business. A data miner often wants to look at the same information several different ways to see what happens when certain variables are changed. The pre-planned, canned approach of materialized views is not useful for this type of ad-hoc analysis. In addition, the materialized views approach requires additional resources to pre-compute and store the result of the pre-planned query, and to maintain it as the contents of the tables involved change.

An improved method for handling database queries including functional expressions against columns having enumerated storage is required. This improved method should be useful for ad-hoc queries and not just for pre-defined queries where a specific query expression is known in advance and is not varied. The method should also enable more efficient calculation and projection of results of a database query, thereby accelerating processing of the query and return of results. The present invention satisfies these and other needs.

GLOSSARY

The following definitions are offered for purposes of illustration, not limitation, in order to assist with understanding the discussion that follows.

Functional Expression: In the context of relational databases, a functional expression is an expression whose domains fall into one of the domains a user can specify when creating a column in a table, and whose result depends only on the arguments it receives. The American National Standards Institute (ANSI) SQL-92 standard defines many such functional expressions that are grouped into two categories: value functions, including CHARACTER_LENGTH, POSITION, TRIM, SUBSTRING, LOWER, UPPER, and CAST, and value expressions, including +, -, *, and || (the string concatenation operator).

Look-up table: A look-up table is an internal data structure within a database that contains information regarding the values in an associated column with enumerated storage.

Predicate: In the context of relational databases a predicate is a truth-valued function, possibly negated, whose domain is a set of attributes and/or scalar values and whose range is {true, false, unknown}.

SQL: SQL stands for Structured Query Language, which has become the standard for relational database access, see e.g., Melton, J. (ed.), American National Standard ANSI/ISO/IEC 9075-2: 1999, *Information Systems—Database Language—SQL Part2*: Foundation, the disclosure of which is hereby incorporated by reference. For additional information regarding SQL in database systems, see e.g., Date, C., *An Introduction to Database Systems, Volume I and II*, Addison Wesley, 1990, the disclosure of which is hereby incorporated by reference.

SUMMARY OF THE INVENTION

The present invention provides an improved method for accelerating execution of database queries including a predicate containing functional expressions against columns having enumerated storage. The method commences with the receipt of a query including a predicate having at least one functional expression referencing at least one database column containing offsets to values in enumerated storage. Upon receipt of a query including this type of predicate, a look-up table is created for storing results of evaluation of the predicate against the values in enumerated storage. Each functional expression of the predicate is evaluated against the values in enumerated storage and the results of evaluation are stored in the look-up table. Theses results of evaluation stored in the look-up table may then be accessed through use of the offsets to values in enumerated storage.

The improved method of the present invention may also be utilized for projecting expressions against database columns having enumerated storage. In this situation, the method commences when a query containing an expression requiring projection of values from at least one database column containing offsets to values in enumerated storage is received. A look-up table is created to contain the results of evaluation of at least one expression of the query against the values in enumerated storage. One or more query expressions are then evaluated against the values in enumerated storage and the results of evaluation are stored in the look-up table. The result of evaluation may then be retrieved from the look-up table using the offsets to values in enumerated storage.

DETAILED DESCRIPTION OF A PREFERRED EMBODIMENT

The following description will focus on the presently preferred embodiment of the present invention, which may be implemented in a data processing environment including, for example, clients operating in an Internet-connected environment (e.g., desktop computers running under Microsoft Windows XP) in communication with one or more server computers (e.g., one or more back-end servers running under a server operating system). The present invention, however, is not limited to any one particular application or any particular environment. Instead, those skilled in the art will find that the system and methods of the present invention may be advantageously embodied on a variety of different configurations and platforms, including Macintosh, Linux, BeOS, Solaris, UNIX, NextStep, FreeBSD, and the like. Therefore, the description of the exemplary embodiments that follows is for purposes of illustration and not limitation.

I. Computer-based Implementation

A. Basic System Hardware (e.g., for Desktop and Server Computers)

Figure 1:
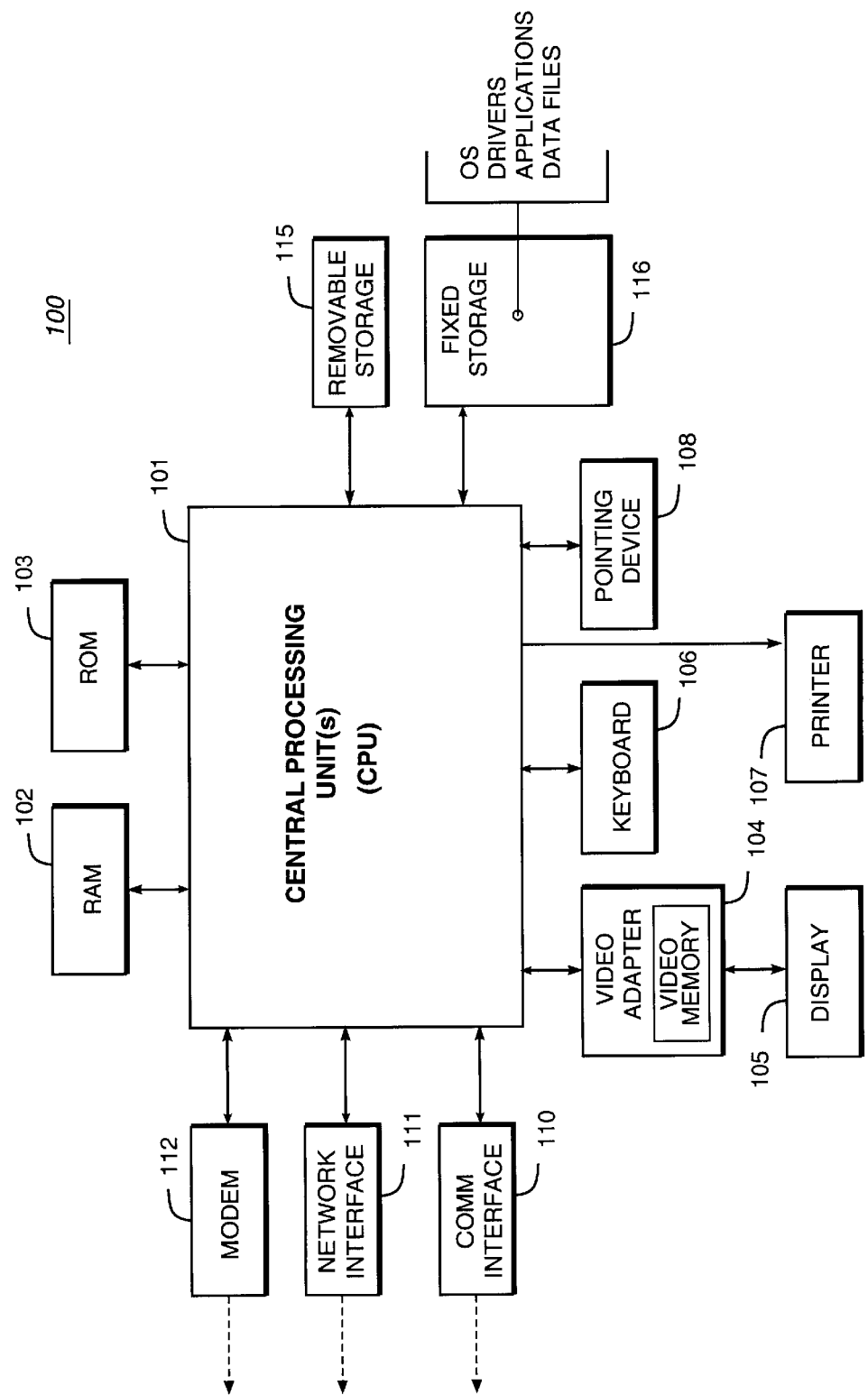
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
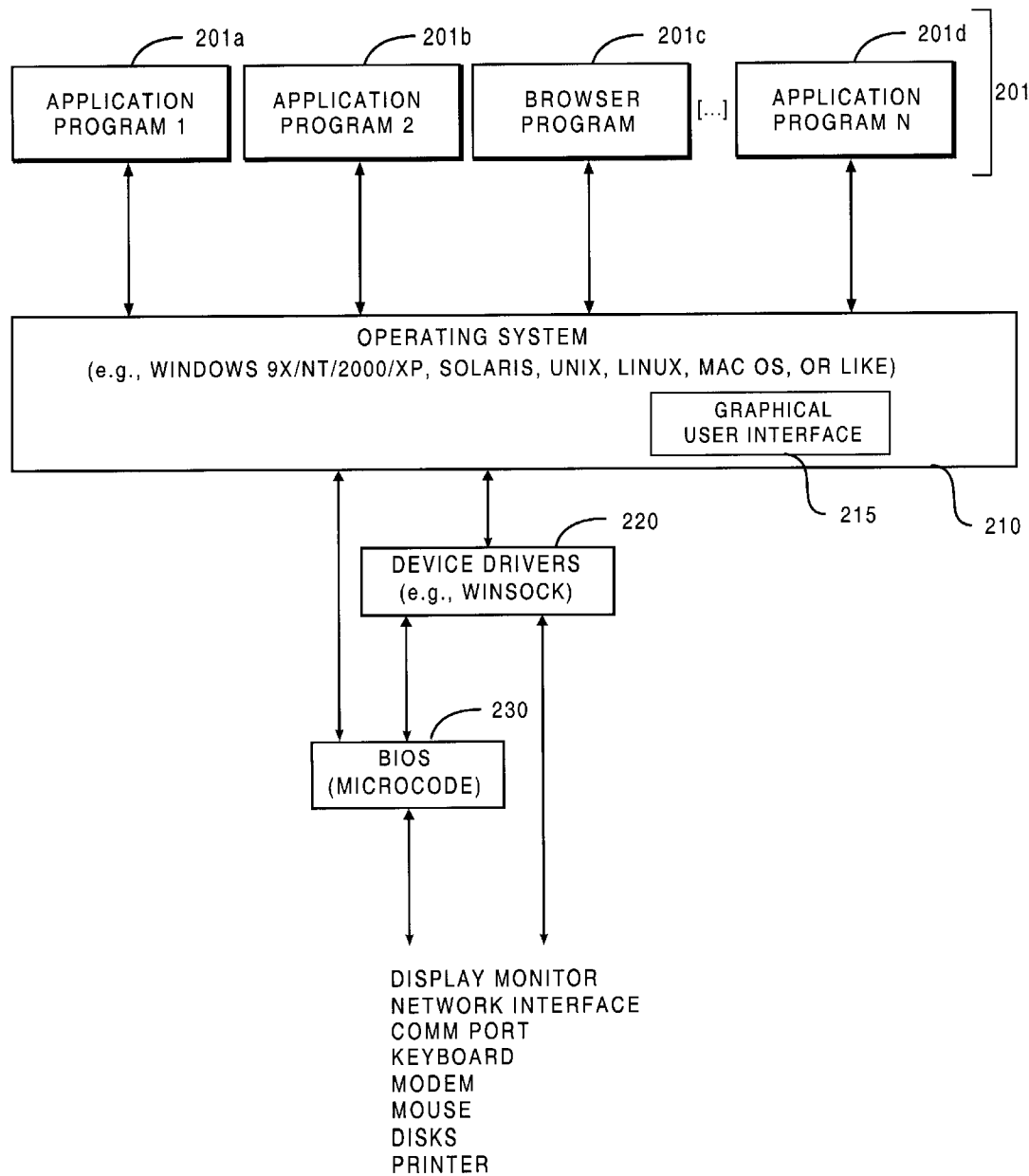
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

While the invention is described in some detail with specific reference to a single preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

C. Client/Server Database Management System

Figure 3:
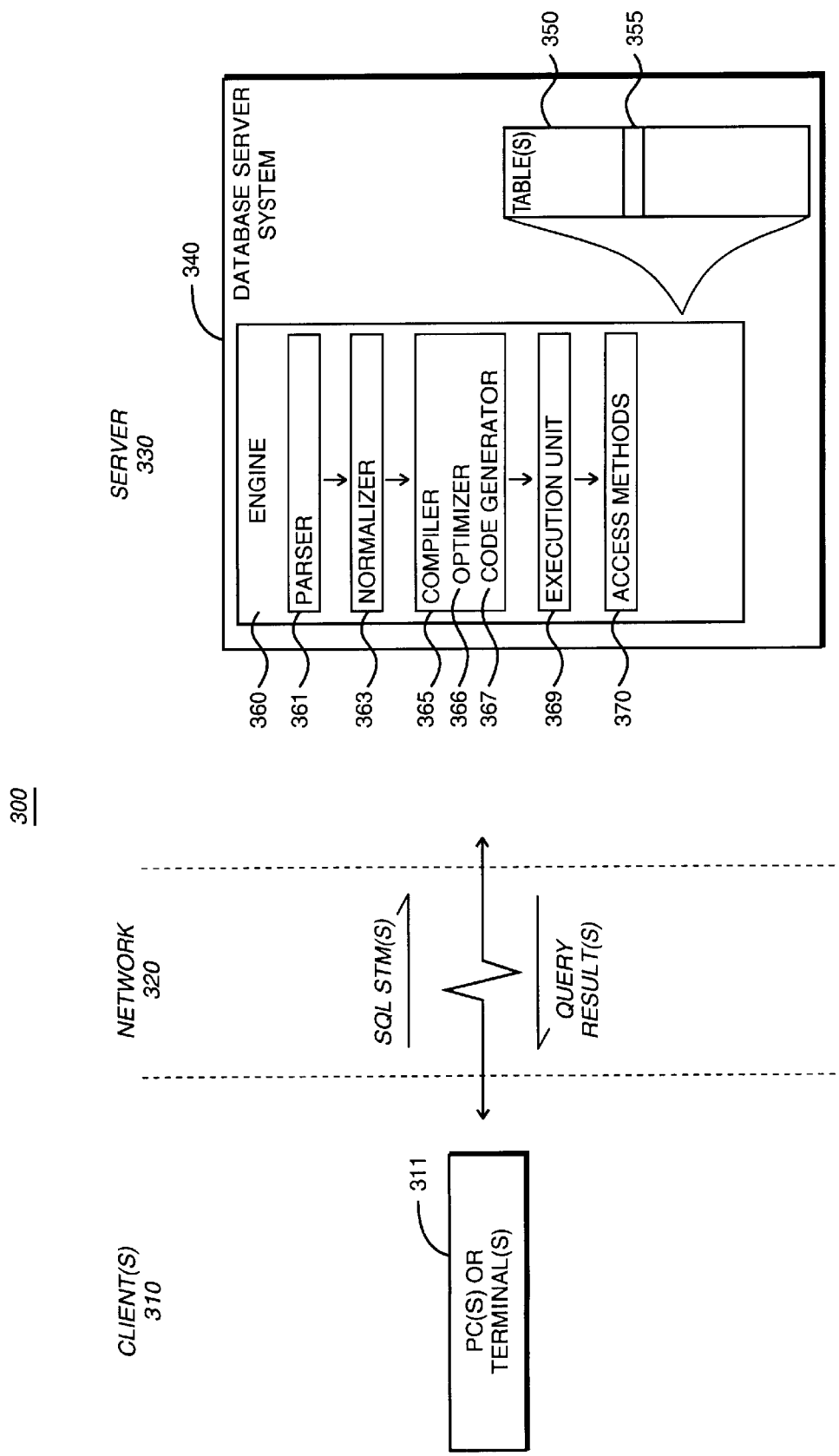
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as Microsoft® Windows client operating system (e.g., Microsoft® Windows 95/98, Windows 2000, or Windows XP).

The database server system 340, which comprises Sybase® Adaptive Server® IQ (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), or UNIX (Novell). The network 320 may be any one of a number of conventional network systems, including a Local Area Network (LAN) or Wide Area Network (WAN), as is known in the art (e.g., using Ethernet, IBM Token Ring, or the like). Network 320 includes functionality for packaging client calls in the well-known SQL (Structured Query Language) together with any parameter information into a format (of one or more packets) suitable for transmission across a cable or wire, for delivery to the database server system 340.

Client/server environments, database servers, and networks are well documented in the technical, trade, and patent literature. For a discussion of database servers and client/server environments generally, and Sybase architecture particularly, see, e.g., Nath, A., *The Guide to SQL Server*, Second Edition, Addison-Wesley Publishing Company, 1995. For a description of Sybase® Adaptive Server® IQ, see, e.g., *Adaptive Server IQ 12.4.2 Product Documentation*, which includes the following: (1) *Adaptive Server Anywhere Programming Interfaces Guide*, (2) *Adaptive Server IQ Administration and Performance Guide*, (3) *Introduction to Adaptive Server IQ*, (4) *Adaptive Server IQ Multiplex User's Guide*, (5) *Adaptive Server IQ Reference Manual*, and (6) *Adaptive Server IQ Troubleshooting and Error Messages Guide*, all available from Sybase, Inc. of Dublin, Calif. (and currently available via the Internet at http://sybooks.sybase.com/iq.html). The disclosures of the foregoing are hereby incorporated by reference.

In operation, the client(s) 310 store data in, or retrieve data from, one or more database tables 350, as shown at FIG. 3. Typically resident on the server 330, each table itself comprises one or more rows or "records" (tuples) (e.g., row 355), each storing information arranged by columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the clients 310 issue one or more SQL commands to the server 330. SQL commands may specify, for instance, a query for retrieving particular data (i.e., data records meeting the query condition) from the database table(s) 350. The syntax of SQL (Structured Query Language) is well documented; see, e.g., the above-mentioned *An Introduction to Database Systems*. In addition to retrieving the data from Database Server tables, the Clients also include the ability to insert new rows of data records into the table; Clients can also modify and/or delete existing records in the table(s).

In operation, the SQL statements received from the client(s) 310 (via network 320) are processed by engine 360 of the database server system 340. Engine 360 itself comprises parser 361, normalizer 363, compiler 365, execution unit 369, and access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer can also look-up any referential integrity constraints which exist and add those to the query.

After normalization, the query tree is passed to the compiler 365, which includes an optimizer 366 and a code generator 367. The optimizer is responsible for optimizing the query tree. The optimizer performs a cost-based analysis for formulating a query execution plan. The optimizer will, for instance, select the join order of tables (e.g., when working with more than one table); it will select relevant indexes (e.g., when indexes are available). The optimizer, therefore, performs an analysis of the query and picks the best execution plan, which in turn results in particular ones of the access methods being invoked during query execution.

The code generator, on the other hand, converts the query tree into a set of instructions suitable for satisfying the query. These instructions are passed to the execution unit 369. Operating under the control of these instructions, the execution unit 369 generates calls into lower-level routines, such as the access methods 370, for retrieving relevant information (e.g., row 355) from the database table 350. After the plan has been executed by the execution unit, the server returns a query result or answer table back to the client(s).

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. Accelerating Functional Expressions Against Columns Having Numerated Storage A. Overview The present invention leverages enumerated storage for a particular column of a database table by using the same offset associated with raw data values stored in a dictionary or look-up table for other purposes. More particularly, if a database column already has enumerated storage (i.e., a look-up table), the data offset for such enumerated storage may also be used as an address (or look-up value) for access to a pre-computed result of a predicate involving arbitrary functional expressions on a column, or as an address for access into a pre-computed result value of an arbitrary functional expression on a column. For instance, in the case of a predicate on a column of state names including an expression such as AND SUBSTRING (T. STATE_NAME, 2, 1)='e', this expression need only be evaluated once per entry in the look-up table. The offset to the existing look-up table may then be used an offset to an additional result look-up table where the result of this query expression for the value in that row of the column has been pre-computed and stored. Use of the offset to a pre-computed result in a result look-up table increases efficiency as it avoids the expensive task of recomputing the functional expression for every row of raw data for the column in order to answer the query.

This may be demonstrated by the following example of a column of state names with enumerated storage which is called T. STATE_NAME. This column has a look-up table as follows:

| | T.STATE_NAME column look-up table | |
|---|---|---|
| offset 1 | Texas | |
| 2 | Georgia | |
| 3 | Massachusetts | |
| 4 | New York | |
| 5 | Maine | |

The offset indicated in the above column look-up table is then stored in the column of the database in lieu of the raw values above. An example of the creation of an additional result look-up table in accordance with the present invention will now be described.

The present invention provides for an additional look-up table (a predicate expression result look-up table or expression result look-up table) to be created at the time of query execution to indicate for each particular entry (e.g., state name) in the column look-up table the result of evaluation of a particular query expression such as AND SUBSTRING (T. STATE_NAME, 2, 1)='e'. The following example illustrates the expression result look-up table created in accordance with the methodology of the present invention to store the result of the evaluation of this query expression:

| | Expression result look-up table | |
|---|---|---|
| offset 1 | TRUE | |
| 2 | TRUE | |
| 3 | FALSE | |
| 4 | TRUE | |
| 5 | FALSE | |

As shown, one entry in the expression result look-up table is created for each entry in the column look-up table. The expression result look-up table is created by evaluating the query expression against the values stored in the original column look-up table and storing the result. This expression result look-up table may then be used to accelerate execution of a query including this expression against this column. Creation and use of this expression result look-up table avoids undertaking an expensive column expression re-execution for each row's raw data values. Instead, each unique expression on the column need only be evaluated once per entry in the column look-up table.

A similar approach may also be used for projection of expressions on columns having enumerated storage. For instance, the present invention may be employed when such an expression is computed for use in some other portion of a query, such as a join predicate or in a SQL select list. A typical instance involving projection of an expression over a column with enumerated storage is a SQL SELECT statement such as the following: SELECT SUBSTRING (T. STATE_NAME, 2, 1) FROM T. The following is an example of the creation of an expression result look-up table from the projection of this SQL SELECT statement over the T_NAME column with the above column look-up table (enumerated storage):

```
              Expression
              result
              look-up table offset  1   |  'e'  |
             2   |  'e'  |
             3   |  'a'  |
             4   |  'e'  |
             5   |  'a'  |
```

As shown, the above expression selects a single character at the second position of the string in the column lookup table. The result of this expression evaluation is stored in an expression result look-up table in the manner previously described.

The methodology of the present invention may also be used in conjunction with more complex predicates containing expressions against columns having enumerated storage. The following is an example of a compound predicate containing expressions against a column with enumerated storage:

```
SELECT T.CUSTOMER FROM T
WHERE ( SUBSTRING(T.STATE_NAME, 1, 1) = 'e'
    OR SUBSTRING(T.STATE_NAME, 2, 1) = 'e'
    OR SUBSTRING(T.STATE_NAME, 3, 1) = 'e'
    OR SUBSTRING(T.STATE_NAME, 4, 1) = 'e'
    OR SUBSTRING(T.STATE_NAME, 5, 1) = 'e' )
```

The following expression result look-up table would be generated as a result of the above compound expression against the above T. STATE_NAME column look-up table.

```
              Expression result
              look-up table offset  1   |  TRUE   |
             2   |  TRUE   |
             3   |  FALSE  |
             4   |  TRUE   |
             5   |  TRUE   |
```

The approach of creating a look-up table to store results of an expression evaluation enables a considerable performance improvement in executing many typical database queries. For example, a database query may contain predicates for selecting particular rows of columns or tables of the database, projecting the selected rows, and then for each row computing the result of an expression. The methodology of the present invention allows particular expressions to be pre-computed and stored in an expression result look-up table, thereby replacing multiple instances of the calculation or evaluation of a particular expression with a table look-up of a previously determined result.

B. Modular Description

Figure 4:
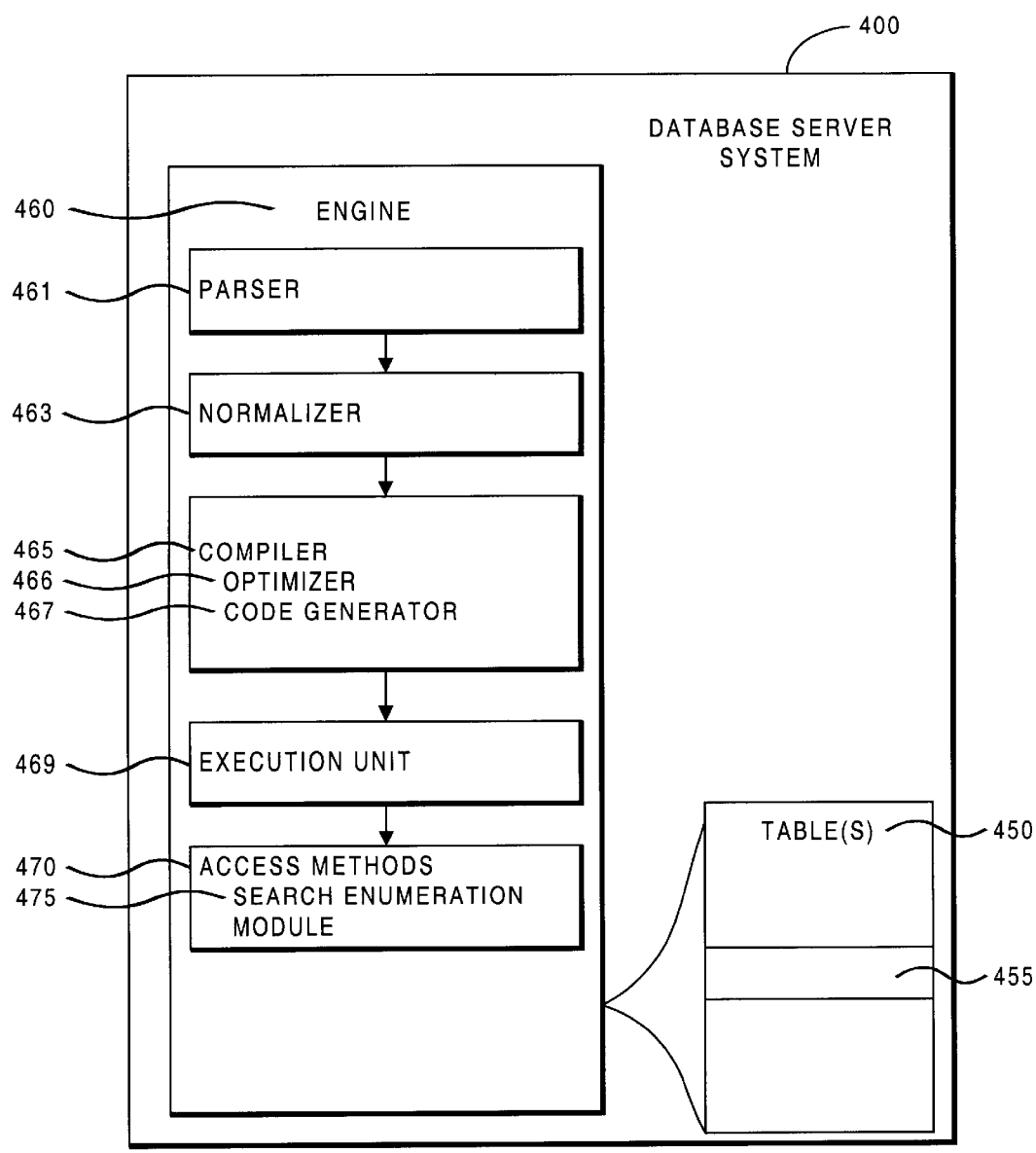
FIG. 4 illustrates the general structure of a database server system modified for implementation of the present invention.

The present invention is preferably embodied in a client/server system database system as previously described. FIG. 4 illustrates the general structure of a database server system 400 modified for implementation of the present invention. Database server system 400, as shown at FIG. 4, is similar to database server system 340 previously illustrated at FIG. 3. However, certain modifications to the database engine have been made to implement the present invention as described below.

Database server system 400 includes an engine 460 and database table(s) 450. Engine 460 includes parser 461, normalizer 463, compiler 465, execution unit 469, and access methods 470. Complier 465 includes an optimizer 466 and a code generator 467. Of particular interest to the present invention, access methods 470 includes a search enumeration module 475 which accelerates execution of functional expressions against columns having enumerated storage as described in more detail below. The database server system 400, which comprises Sybase® Adaptive Server® IQ (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.) or UNIX (Novell). The functions performed by each module of engine 460 in executing a query will now be described.

When an SQL query is received by engine 460, the query is passed to the parser 461 which converts the statements into a query tree—a binary tree data structure which represents the components of the query in a format selected for the convenience of the system. The query tree is next normalized by the normalizer 463 in the manner previously described. After normalization, the query tree is passed to the compiler 465, which includes an optimizer 466 and a code generator 467. After optimization of a query, code generator 467 converts the query tree into a set of instructions suitable for satisfying the query. These instructions are passed to the execution unit 469. Operating under the control of these instructions, the execution unit 469 generates calls into lower-level routines, such as the access methods 470, for retrieving relevant information (e.g., row 455) from the database table 450. Of particular interest to the present invention, lower level routines called by the execution unit 469 include a search enumeration module 475 for accelerating execution of functional expressions against columns having enumerated storage. Search enumeration module 475 operates at the level of the access methods for particular tables of the database.

In the currently preferred embodiment, the database system can evaluate multiple predicates against one or more columns and combine results of all of these predicate evaluations together via bitmaps to determine the result set of rows that satisfy all of the conditions present on that table. The search enumeration module 475 of the present invention operates at this level where the database system has received a query containing a set of conditions (predicates) on a specific table and is attempting to decide both the access path to be used to evaluate such predicates against that table and the order in which such predicates should be evaluated. As described below, the search enumeration module may modify the manner in which predicates involving arbitrary functional expressions are evaluated and result sets are formed in response to a particular query. The operations of the present invention in the execution of a database query will now be described.

C. Acceleration of Complex Queries on Columns Having Enumerated Storage

Figure 5A:
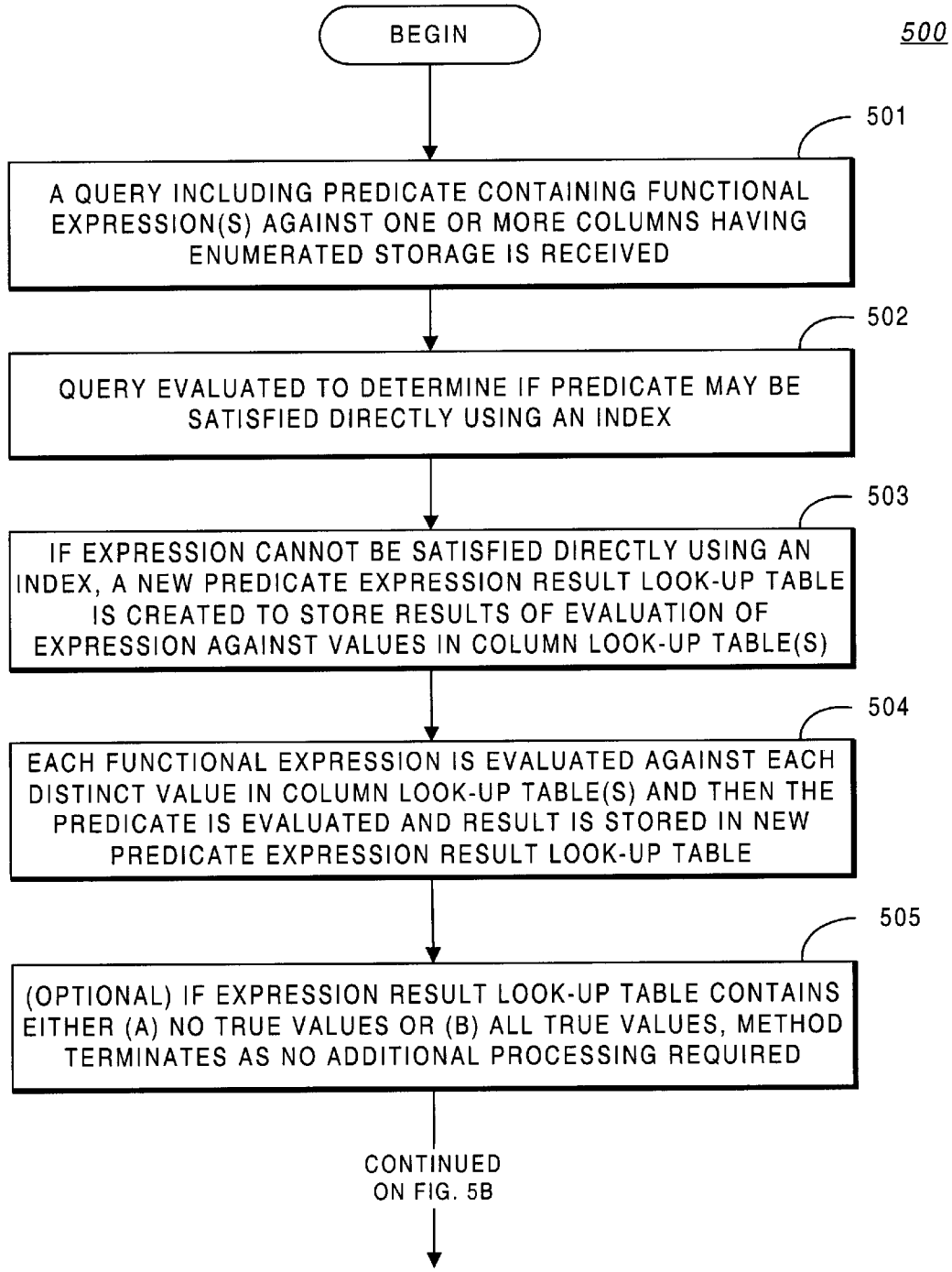
FIGS. 5A–B comprise a single flowchart illustrating the detailed method steps of the operation of the present invention in accelerating execution of a predicate containing a functional expression against database column(s) having enumerated storage.
Figure 5B:
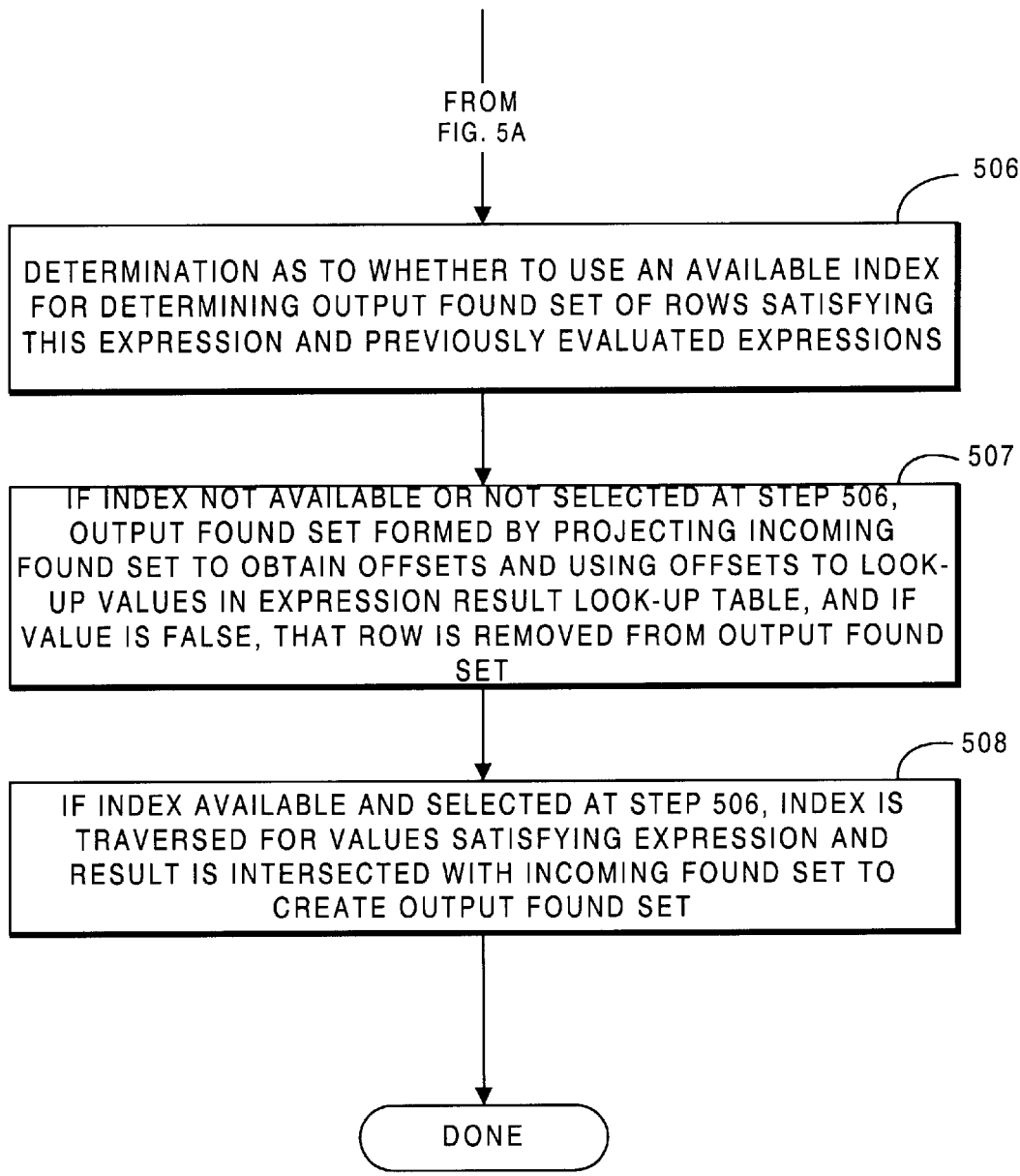

FIGS. 5A–B comprise a single flowchart illustrating the detailed method steps of the operation of the present invention in accelerating execution of a query containing a predicate that includes a functional expression against database column(s) having enumerated storage. As shown, the method begins, at step 501, upon receipt of a query containing a predicate involving a functional expression against one or more columns having enumerated storage from one or more tables of a database. Typically, a query would be against one or more columns from a single table. However, the query may also seek information from columns of different tables, such as columns of different tables that are stored together in a joined materialized view. In the event of multiple tables, the columns of such tables must be available from a common source, such that the row numbers are common across the related tables.

The method steps illustrated at FIGS. 5A–B that are described below use an example of the evaluation of a predicate containing an arbitrary complex functional expression against a single database column having enumerated storage. However, the methodology of the present invention is not limited to being used in this context. Rather, the present invention may be applied in conjunction with query expressions referencing a plurality of columns in a single table. As described above, the method may also be used for columns of different tables when such tables are joined together, such as tables that are joined in a materialized view. Modification of the methodology of the present invention for use in conjunction with predicate(s) referencing a plurality of columns having enumerated storage is described below in this document.

At step 502, the query expression is evaluated to determine whether any predicates of the query contain functional expressions on columns having enumerated storage that cannot be evaluated using an index. If a particular query expression can be evaluated using an index, then it is typically more efficient to evaluate the expression using the index. However, if the query contains at least one predicate containing expression(s) that cannot be satisfied directly using an index, the method proceeds to step 503 for evaluation of such expression(s). The following discussion will describe the steps for evaluation of one expression, however the same methodology may be repeated for other expressions and other predicates of a query.

At step 503, a new predicate expression result look-up table is created. The purpose of the predicate expression result look-up table is to store the results of evaluation of the expression against each of the values included in the column look-up tables. This new predicate expression result look-up table (hereinafter referred to as an "expression result look-up table" or a "result look-up table") is the same size as the original look-up table for the column having enumerated storage. For instance, in the case of a column of states of the United States, the column look-up table may have 50 values. The new expression result look-up table that is derived from this column look-up table will also have 50 values.

Next, at step 504, each functional expression in the predicate is evaluated against each distinct value in the column look-up table. If expressions are nested, then the expressions are evaluated in depth first order. Then the predicate itself is evaluated using the results of the evaluation of the functional expressions. The result of the evaluation of the predicate expression against each value in the column look-up table is stored in the result look-up table. For example, if the result of evaluation of a predicate containing functional expressions is true, the Boolean value TRUE will be stored in the result look-up table. In the currently preferred embodiment, this value in the result look-up table is identified by the same offset as the offset to the evaluated value in the column look-up table. At the end of this step 504, values have been inserted into every row of the derived result look-up table.

As an optimization, at step 505, an expression result look-up table containing Boolean values is evaluated to determine if it contains either (a) no true values, or (b) all true values for a particular expression. If a particular result look-up table contains no true values (i.e., no values in the column satisfy this particular search condition), additional processing of this expression can be avoided by simply clearing the result set. Similarly, if all of the Boolean values in the result look-up table are true, then further processing is also unnecessary as this particular expression does not result in any change to the then current found (or result) set of rows that are responsive to the query. If the Boolean values in the expression look-up table are either all true or all false, there is no need to individually examine rows of the present column and the following steps are unnecessary. However, if at least one, but less than all, of these Boolean values are true, the method proceeds to step 506.

If an index, such as a B-Tree index, is available on the column having enumerated storage, at step 506 the optimizer determines whether to use the index for determining the output found set (i.e., the set of rows satisfying the predicate containing this expression as well as to previously evaluated predicates). An optimizer may choose to use an available index rather than projecting values from rows of the column to form the output found set. If an index is not available, or in the event the optimizer determines that use of an index is inefficient, the method proceeds to step 507. Alternatively, if the optimizer determines the cost of using an available index is low given the number of distinct values satisfying the predicate, this index may be used to create the output found step and the method proceeds to step 508. In deciding whether or not to use an available index, the optimizer compares the costs of projecting the values in the enumerated column to the costs of processing disjunctions in an index. This costing decision will typically involve consideration of the number of rows in the found set prior to evaluation of the particular predicate containing this functional expression and the number of rows in the current column that satisfy this particular predicate. If the incoming found set contains a small number of rows, then the optimizer will typically choose to take advantage of this limited set and project a relatively small number of rows from the column. On the other hand, if the incoming found set is large and the number of rows of the column satisfying the predicate is small, use of the index may be more efficient.

At step 507, the incoming found set (i.e., the set of rows responsive to previously evaluated conditions) is projected and the offset values in these rows are used to look-up into the expression result look-up table. Each row in the incoming found set is then evaluated to determine whether or not it satisfies this additional condition (i.e., the condition evaluated in this expression result look-up table). The expression result look-up table is consulted to determine whether each row in the found set satisfies this condition and an output found set is formed as a result. For example, a predicate being evaluated may contain the following expression:

SELECT T.CUSTOMER FROM T
SUBSTRING (T.STATE_NAME, 2, 1)='e',

A cell in row 3000 of the STATE_NAME column may have an offset value of 2. This offset in the column look-up table indicates the state name is "Georgia." In the expression result look-up table the value associated with this offset is TRUE, as the second letter of the state name is the letter "e". Accordingly, row 3000 will be included in the output found set and the next row in the incoming found set may be examined. This examination continues until all rows of the incoming found set have been evaluated and an output found set from this stage of query processing has been created.

Alternatively, if the optimizer determines the cost of using an available index is low given the number of distinct values satisfying the predicate, at step 508, the index is used to create the output found set. In this event, in the currently preferred embodiment, the result look-up table is traversed and for each TRUE entry in the result look-up table, that offset is used to access the column's look-up table to get the column value that satisfied the predicate, the column value is then used to access the B-tree index to get the set of rows that contain that value. That result set is then combined with the set of rows that correspond to other TRUE entries in the result look-up table. The final result set is given by the intersection of the incoming found set and the union of the result sets for each individual value obtained from the B-tree index. For instance, if the predicate contained an expression seeking state names beginning with the letter "H", each state name in the index that starts with "H" is joined together. The result of this union is then intersected with the incoming found set (i.e., the rows satisfying other previously examined predicates of the query) to create an output found set.

The result of step 507 or step 508 is an output found set for a particular functional expression. Other functional expressions of this predicate or other predicates may then be evaluated until all predicates in the query have been evaluated and a final result set created. Evaluation of other predicates in the query may include application of the present methodology.

A similar approach may be used for projection of expressions over columns having enumerated storage. In this approach the access methods module 370, as shown at FIG. 3, is enhanced to recognize when a functional expression contains one or more columns using enumerated storage, and to consider projection of the expression results using the methodology of the present invention as an alternative to the traditional projection of the column and the subsequent evaluation of the expression for each row. The use of the methodology of the present invention in projection of expressions over columns will now be described in greater detail.

D. Example of Projection of Expression Over a Column

As previously described, the same approach of creating a look-up table for accelerating execution of a query may also be used for projecting expressions on columns having enumerated storage. Although certain kinds of outer joins or other particular expressions do not allow for use of this methodology, it is available in a number of situations, such as arithmetic expressions, whenever a particular expression can be evaluated at the table node of the query. A good example of an expression for which the present methodology may be advantageously applied is the following from TPC-H benchmark Query 1 (*Transaction Processing Performance Counsel, Standard Specification*, Revision 1.3.0, available from Transaction Processing Performance Council, San Jose, Calif.):

sum(1_extendedprice*(1−1_discount)) as sum_disc_price, sum(1_extendedprice*(1−1_discount)*(1+1_tax)) as sum_charge, If each of the columns 1_discount and 1_tax have enumerated storage, then both the (1−1_discount) and the (1+1_tax) values can be calculated once per distinct value and stored in an expression result look-up table. This expression result look-up table is indexed by the same offset that the column itself (e.g., the 1_discount column) uses to reference a particular discount. In a simple case, if an 1_discount column raw value is 20% (i.e., representing a 20% discount), the value (1−1_discount) for this value is 0.8 (or 80%). The methodology of the present invention provides for this derived value to be stored in the expression result look-up table. This enables this derived value to be looked up from this table when required in conjunction with execution of a particular query, thereby avoiding repeatedly making this same calculation for every row of the column.

Figure 6A:
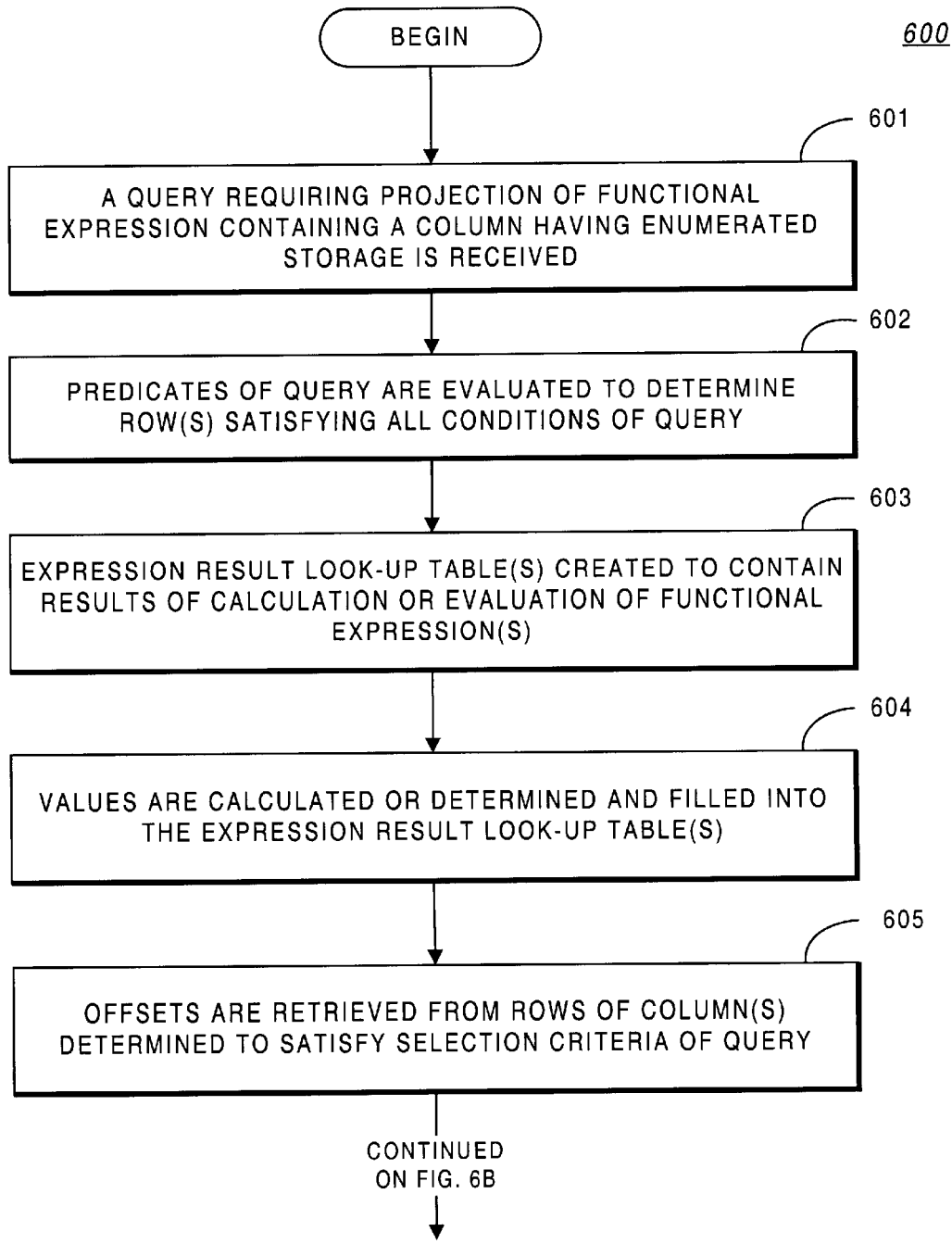
FIGS. 6A–B comprise a single flowchart illustrating the steps required for projection of a functional expression containing a column having enumerated storage using the improved methodology of the present invention.
Figure 6B:
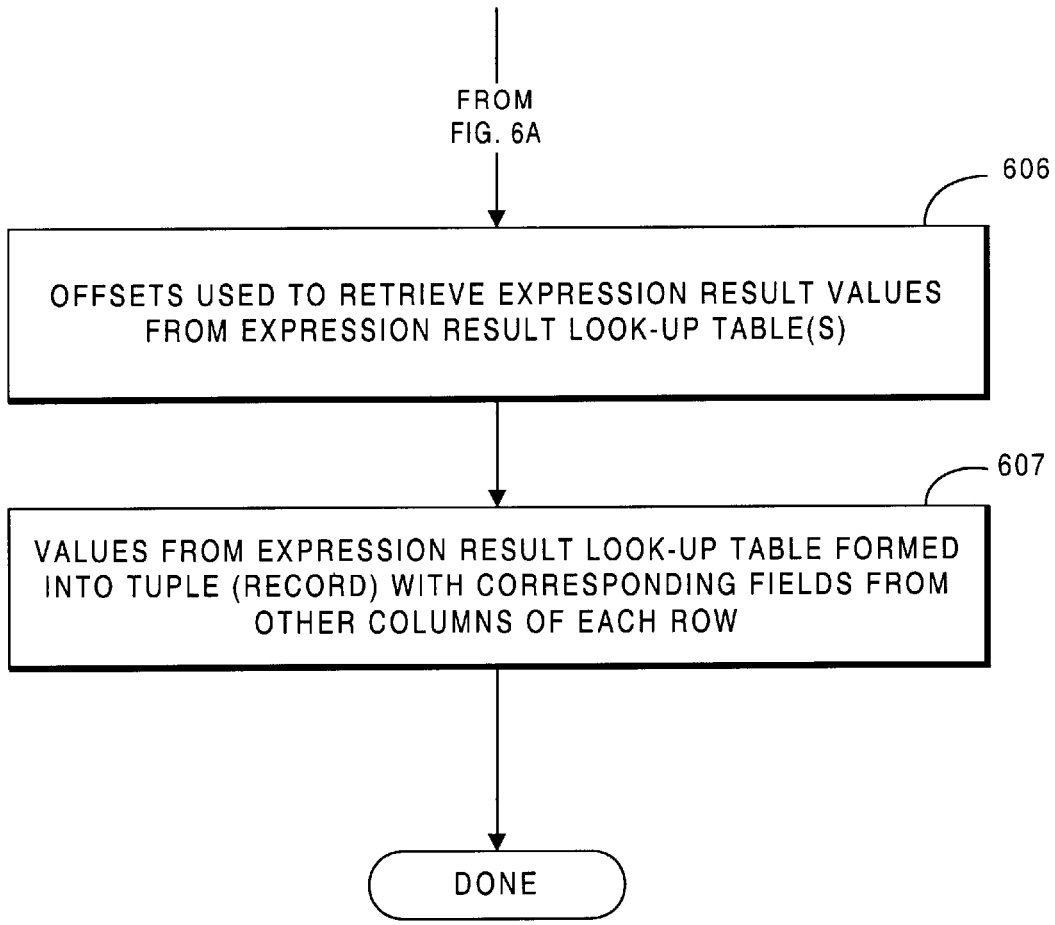

FIGS. 6A–B comprise a single flowchart illustrating the steps required for projection from a column having enumerated storage using the improved methodology of the present invention. As shown, at step 601 a query requiring projection of values from row(s) of a column having enumerated storage is received. A projection from one or more columns having enumerated storage may be required when the column(s) are used somewhere else in a particular query, such as by a SQL SELECT statement of the query. At step 602, all of the predicates of such query are evaluated to determine row(s) of the column(s) that satisfy all of the conditions of the query. In connection with the evaluation of this query, at step 603, one or more expression result look-up table(s) are created to contain the results of calculation or evaluation of a particular predicate of the query. An expression result look-up table may be a simple array if the functional expression includes only one enumerated storage column or an N-dimensional array in the event that the predicate is over more than one column. Creating and use of an N-dimensional array to contain results of calculation or evaluation of a particular functional expression or predicate is described in more detail below.

At step 604, values are calculated and filled into the expression result look-up table. At this point, the expression result look-up table has been completed and all predicates of the query have been evaluated to determine the rows satisfying the conditions of the query. Next, at step 605, offsets are retrieved from the rows of the column(s) that have been determined as satisfying the selection criteria of the query. At step 606, such offsets are used to retrieve expression result values from the expression result look-up table. At step 607, the values retrieved from the expression result look-up table are passed up to be formed into a tuple (or record) that contains these values together with corresponding fields from other columns of rows selected in the query.

In the case of the TPC-H query referenced above when it is run at scale 100 on a database system holding 100 gigabytes of data, the (1+1_tax) calculation would be executed approximately 600 million times in prior art database systems to calculate taxes for each row of data. However, for this benchmark there are only 11 possible values of 1_tax. Thus, use of the methodology of the present invention would replace 600 million expressions with 11 expressions in this instance. Similarly, for the second example expression above (sum(1_extendedprice*(1−1_discount)*(1+1_tax)) as sum charge) there may be only a total of 99 values (11 tax rates multiplied by 9 discount rates). Thus, millions of mathematical operations may be replaced by calculating and storing 99 distinct values in a two-dimensional expression result look-up table. Offsets retrieved from these two columns (e.g., 1_discount and 1_tax) may be used together to retrieve the appropriate result from this two-dimensional expression result look-up table. In the case of this TPC-H Query 1 for a 100-gigabyte (or scale 100) database, this approach of creating a table and looking up 99 distinct values replaces approximately 1.8 billion arithmetic operations. This provides a significant performance improvement in the processing of a query of this nature. The process for creating and use of a multi-dimensional expression result look-up table will now be explained.

E. Predicate Against Multiple Columns Having Enumerated Storage

The methodology of the present invention may also be used in situations more complex than the foregoing examples involving a predicate against a single column of a single table. A more complicated case in which the present invention may be used involves a projection of an expression over two or more columns having enumerated storage. To illustrate this case, assume that a particular expression, such as a SQL SELECT statement, refers to two columns and that both columns have enumerated storage. In this situation, the methodology of the present invention may be used to create and use a special type of expression result look-up table for evaluation of this predicate. This new type of expression result look-up table, instead of being one-dimensional and being one-to-one with a single column look-up table, is N-dimensional, with each dimension corresponding to one of the columns having enumerated storage.

The creation and use of an N-dimensional expression result look-up table is perhaps best illustrated by way of example. For instance, a predicate may refer to two columns of a single table, with state names as the first column and customer gender as the second column. The state name column may include 50 states, while the gender column comprises 2 genders (male and female). The following example illustrates the creation of an expression result look-up table referring to two columns having enumerated storage. In this example, the first column is associated with the above T.STATE_NAME column look-up table containing state names of 5 states. The second column is associated with the following T. GENDER column look-up table:

```
          T.GENDER
       Column look-up table offset  1  |  Male   |
           2  |  Female |
```

An example of a query expression in which an expression is projected over both these two columns (T.STATE_NAME and T.GENDER) is the following:

SELECT SUBSTRING(T.STATE_NAME, 1, 1)
|| SUBSTRING(T.GENDER, 2, 1)
|| SUBSTRING(T.STATE_NAME, 3, 1)
|| SUBSTRING(T.GENDER, 4, 1)
FROM T

The two-dimensional expression result look-up table which is created in accordance with the present invention to store the result of evaluation of this expression against the column look-up tables of these two columns is as follows:

Expression result

```
        look-up table
        T.GENDER offset
                  0   |  1
        T.STATE_NAME
        offset 1  | Taxe | Texa |
               2  | Gaoe | Geoa |
               3  | Mase | Mesa |
               4  | Nawe | Newa |
               5  | Maie | Meia |
```

As illustrated above, this expression result look-up table is created taking each value in the first look-up table and each value in the second look-up table to fill-in a two dimensional array.

Another example of a predicate against these two columns with enumerated storage is the following predicate which includes an expression on at least one of these columns:

SELECT T.CUSTOMER FROM T
WHERE (SUBSTRING(T.STATE_NAME, 1, 1)=SUBSTRING(T.GENDER, 1, 1)
OR SUBSTRING(T.STATE_NAME, 2, 1)=SUBSTRING(T.GENDER, 2, 1)

The two-dimensional expression result look-up table generated after evaluation of this predicate against the two above-described columns is as follows:

```
        Predicate
        look-up table
        T.GENDER offset
                  0     |   1
        T.STATE_NAME
        offset 1  | FALSE | TRUE  |
               2  | FALSE | TRUE  |
               3  | TRUE  | FALSE |
               4  | FALSE | TRUE  |
               5  | TRUE  | FALSE |
```

Although the above examples include expressions referencing two columns, the same methodology may be extended to create an N-dimensional array in the case of an expression referring to three or more columns having enumerated storage.

In the case of a predicate referencing two or more columns, the optimizer needs to make a costing decision as to whether or not creation and use of a two-dimensional look-up table is likely to be more efficient than projecting and evaluating values in rows of these columns. The costing decision may, for example, involve determining whether it is efficient to create and fill-in the two-dimensional array containing 100 values (50 states multiplied by 2 genders). If creation and use of this array approaches the number of evaluations to be made in projecting the values in the referenced columns, it might delay rather than accelerate execution of the query. Accordingly, the optimizer may elect not to create an array in a sub-optimal situation involving, for example, an expression referencing five column look-up tables with each table having 50 (or more) distinct values. However, as previously described, if the number of distinct values in the array (i.e., the expression result look-up table) is small compared to the incoming found set, the methodology of the present invention may considerably accelerate query execution. With respect to the present example, creation and use of a two-dimensional look-up table having only 10 distinct values may provide a significant processing advantage compared to prior art systems.

F. Improved Decision About Optimal Order of Predicates

Whether a particular expression references one column or multiple columns, another advantage of the methodology of the present invention is that it enables one to know how many rows of a column (or columns) will satisfy a particular predicate before the result is formed. In the currently preferred implementation, certain statistics are maintained on each of the distinct values in the column look-up table(s). For a particular value in the look-up table, these statistics may include the number of rows of the column in which that particular value appears (e.g., the number of rows in the state name of Texas appears). As a particular query is evaluated against a column look-up table, the number of rows in the column that are responsive to the predicate may be determined. This enables better evaluation of a decision about optimal order of predicates for purposes of query execution. For instance, if it can be determined from look-up table statistics that 300 million rows of a column of 1 billion rows are responsive to a particular predicate, the optimizer may compare this to other predicates. This comparison may enable the optimizer to find predicates that are more selective (e.g., return fewer rows) and evaluate those more selective predicates first, thereby reducing the execution cost of reading all 300 million rows of this column into the cache. This look-up optimization for enumerated storage can significantly improve processing of a query by evaluating more selective conditions before broader conditions.

G. Use of Hash Table as Alternative Embodiment

In an alternative embodiment, the present invention may use a hash table to store results in the event a column does not have enumerated storage (i.e., look-up table is not available on a column). If one knew that there were a relatively small set of distinct values in particular database columns (e.g., 11 tax rates in the above example), but these columns did not have enumerated storage, one has the option of creating a hash-table for the results. In effect, if there is low cardinality data, a hash table may be created on the fly to serve a role similar to that of the look-up table described above. The other steps of the above-described method remain the same, however the hash table is used in lieu of the look-up tables described above. However, in this alternative embodiment, the costs of creating this hash table must be evaluated and compared to the costs of traditional expression evaluation to determine whether creation of the hash table on the fly will likely result in improved processing of a particular query.

H. Use of Raw Data Values as Offsets in Alternative Embodiment

In another alternative embodiment, the present invention may use the binary form of the raw column values as look-up offsets for a column that does not have enumerated storage. From a performance standpoint, using the raw column values as look-up offsets is equivalent to using enumerated storage, but it requires creation of an array with a size of 2 to the power of the number of bits in the column's data type. As a result, this alternative approach may require utilization of significant memory resources in the case of columns with wide data-types. However, the alternative approach may provide a significant performance improvement over prior art systems when used for columns having narrow data types.

While the invention is described in some detail with specific reference to a single preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system, a method for accelerating queries including a predicate containing functional expressions on database columns having enumerated storage, the method comprising:

receiving a query including a predicate having at least one functional expression referencing at least one database column containing offsets to values in enumerated storage;

creating a look-up table for storing results of evaluation of said predicate against said values in enumerated storage;

evaluating each functional expression of said predicate against said values in enumerated storage and storing results of evaluation of said predicate in said look-up table; and accessing said results of evaluation of said predicate in said look-up table through use of said offsets to values in enumerated storage.

2. The method of claim 1, further comprising:

using said results of evaluation of said predicate for forming a response to said query.

3. The method of claim 1, wherein said step of creating a look-up table includes creating a look-up table containing the number of values in enumerated storage.

4. The method of claim 1, wherein said at least one database column includes columns in different tables which are available from a common source.

5. The method of claim 1, wherein said step of evaluating each functional expression against said values in enumerated storage includes evaluating predicates using results of evaluation of each functional expression of said predicate.

6. The method of claim 5, wherein results of said evaluation of said predicate is stored in said look-up table.

7. The method of claim 1, wherein said step of evaluating said at least one functional expression against said values in enumerated storage includes evaluating nested expressions in depth first order.

8. The method of claim 1, further comprising:

determining whether said look-up table contains no true values; and if said look-up table contains no true values, returning an empty result set in response to said query.

9. The method of claim 1, further comprising:

determining whether said look-up table contains all true values; and if said look-up table contains all true values, terminating evaluation of said predicate as said predicate does not result in any change to a result set satisfying said query.

10. The method of claim 1, wherein said step of evaluating each functional expression includes evaluation of each functional expression against each distinct value in said enumerated storage.

11. The method of claim 1, further comprising:

evaluating said query including a predicate prior to creation of a look-up table to determine if said predicate may be satisfied directly using an index; and if said predicate may be satisfied directly using an index, satisfying said predicate directly using an index without creating a look-up table.

12. The method of claim 1, wherein said step of creating a look-up table includes creating an array for evaluation of said predicate including at least one functional expression against a single column having enumerated storage.

13. The method of claim 1, wherein said step of creating a look-up table includes creating a multi-dimensional array for evaluation of said predicate including at least one functional expression against a plurality of columns having enumerated storage.

14. The method of claim 1, further comprising:
    determining whether an index may be used to generate an output set of rows satisfying said predicate and previously evaluated predicates.

15. The method of claim 1, wherein said step of accessing said results of evaluation of said predicate in said look-up table includes the substeps of:
    projecting the incoming set of rows responsive to previously evaluated expressions to obtain offset values for said incoming set of rows from said column;
    using said offset values to access results in said look-up table; and
    generating an output found set of rows of rows responsive to said predicate and previously evaluated expressions.

16. The method of claim 1, wherein said look-up table includes a data structure for storing said results of evaluation.

17. The method of claim 1, wherein said look-up table includes a hash table for storing said results of evaluation.

18. The method of claim 1, further comprising:
    maintaining statistics on each value in enumerated storage;
    as each functional expression of a predicate is evaluated against said values in enumerated storage, evaluating said statistics to determine an optimal order of predicates for query execution.

19. The method of claim 18, wherein evaluation of said statistics includes comparing the number of rows of a database column responsive to each predicate.

20. In a database system, a improved method for projecting expressions against database columns having enumerated storage, the method comprising:
    receiving a query containing an expression requiring projection of values from at least one database column containing offsets to values in enumerated storage;
    creating a look-up table for containing results of evaluation of at least one expression of said query against said values in enumerated storage;
    evaluating said at least one expression against said values in enumerated storage and retaining results of evaluation in said look-up table; and
    using said offsets to values in enumerated storage to retrieve said results of evaluation from said look-up table.

21. The method of claim 20, further comprising:
    forming said results of evaluation retrieved from said look-up table into a record for response to said query.

22. The method of claim 20, wherein said at least one database column includes columns in different tables which are available from a common source.

23. The method of claim 20, wherein said step of creating a look-up table includes creating an array for storing results of a query containing an expression requiring projection of values from at least one database column.

24. The method of claim 20, wherein said step of creating a look-up table includes creating a multi-dimensional array for storing results of a query containing more than one expression requiring projection of values from at least one database column.

25. The method of claim 20, wherein said expression requiring projection of values includes an arithmetic expression.

26. The method of claim 25, wherein said step of evaluation of an expression includes calculation of results of an arithmetic expression.

27. The method of claim 20, wherein said step evaluating said at least one expression against said values in enumerated storage and retaining results of evaluation in said look-up table includes the substeps of:
    computing results of an arithmetic expression for each distinct value in enumerated storage; and
    retaining said computed results in said look-up table.

28. The method of claim 27, further comprising:
    for each row of said at least one database column retrieving said computed results from said look-up table for forming a response to said query.

29. The method of claim 20, further comprising:
    evaluating all predicates of said query to determine the set of rows satisfying said query prior to projection of values from said at least one database column.

30. The method of claim 20, wherein said expression requiring projection of values is evaluated at the table node of said query.

31. The method of claim 20, wherein said expression requiring projection of values includes a Structured Query Language (SQL) SELECT statement.

32. The method of claim 20, wherein said expression requiring projection of values includes a predicate local to one table.

33. The method of claim 20, wherein said expression requiring projection of values includes an expression computed for use in some other portion of a query.

34. In a database system, a method for accelerating queries including a predicate containing functional expressions on database columns, the method comprising:
    receiving a query including a predicate having at least one functional expression referencing at least one database column having low cardinality data;
    creating a hash table for storing results of evaluation of said predicate;
    evaluating each functional expression of said predicate and storing results of evaluation in said hash table; and
    accessing said results of evaluation of said predicate in said hash table through use of said offsets to values in enumerated storage.

35. In a database system, a method for accelerating queries including a predicate containing functional expressions on database columns, the method comprising:
    receiving a query including a predicate having at least one functional expression referencing a database column not having enumerated storage;
    creating an array for storing results of evaluation of said predicate;
    evaluating each functional expression of said predicate and storing results of evaluation in said array; and
    using a binary form of said database column values as look-up offsets to for said database column not having enumerated storage.

* * * * *